May 7, 1935. W. E. REED 2,000,788
METHOD OF MAKING WIRE FABRIC
Filed April 12, 1933 9 Sheets-Sheet 2
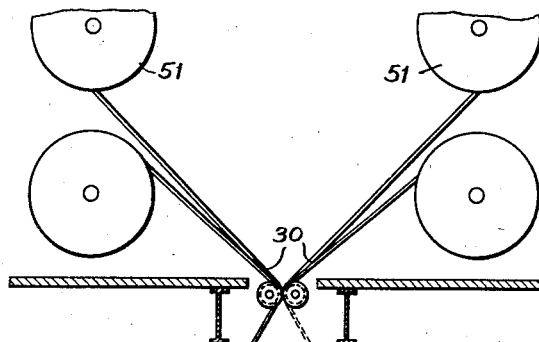
Fig. 3.
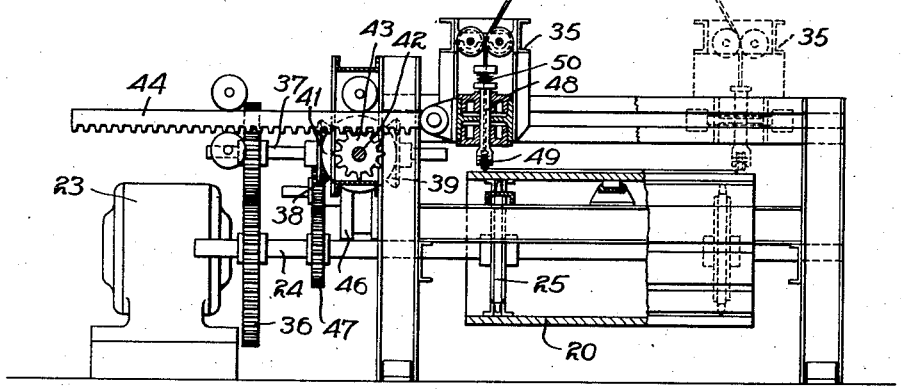
Fig. 8.
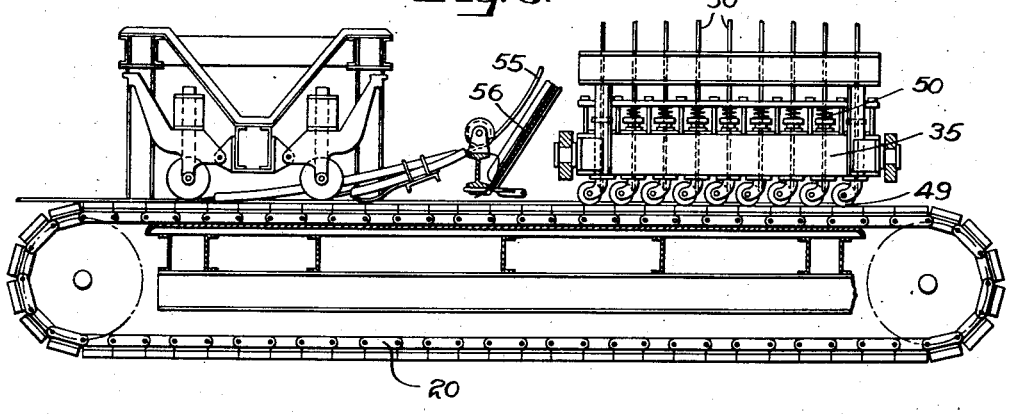
INVENTOR
William Edgar Reed,
By Archworth Martin,
Attorney May 7, 1935. W. E. REED 2,000,788
METHOD OF MAKING WIRE FABRIC
Filed April 12, 1933 9 Sheets-Sheet 3

INVENTOR
William Edgar Reed,
By Archworth Martin,
Attorney.

May 7, 1935.  W. E. REED  2,000,788
METHOD OF MAKING WIRE FABRIC
Filed April 12, 1933   9 Sheets-Sheet 4
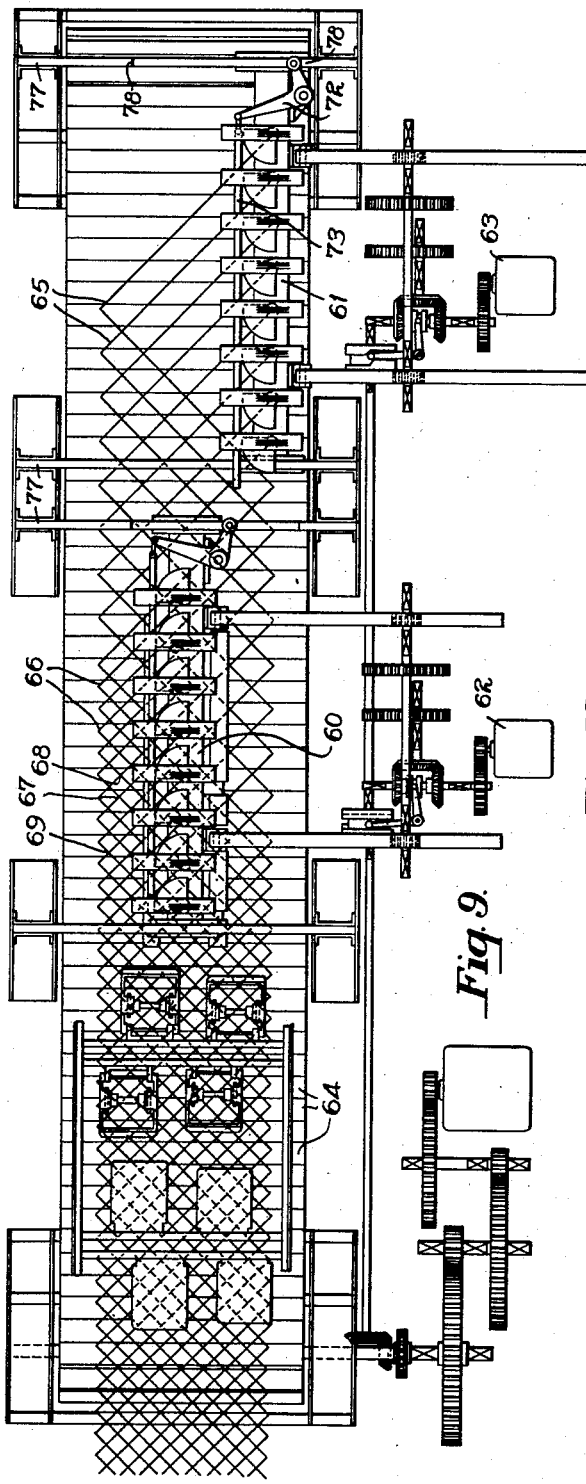
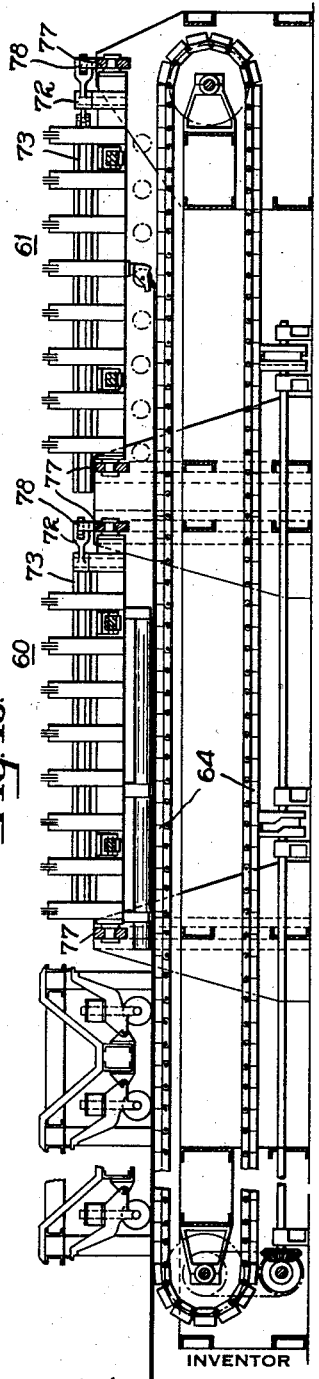
INVENTOR
William Edgar Reed,
By Archworth Martin,
Attorney.

May 7, 1935.  W. E. REED  2,000,788
METHOD OF MAKING WIRE FABRIC
Filed April 12, 1933  9 Sheets-Sheet 5
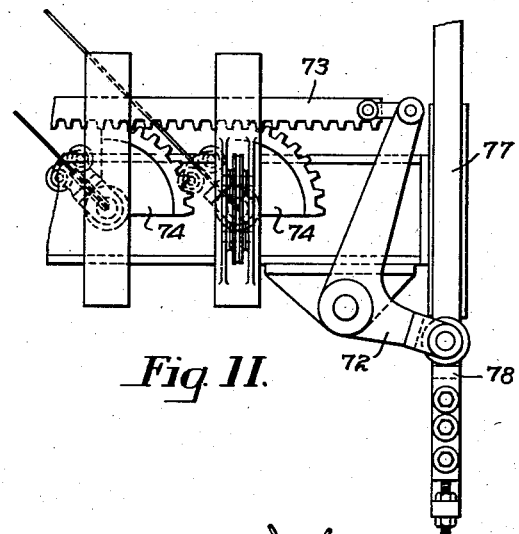
Fig. 11.
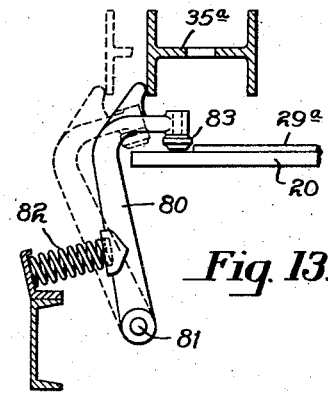
Fig. 13.
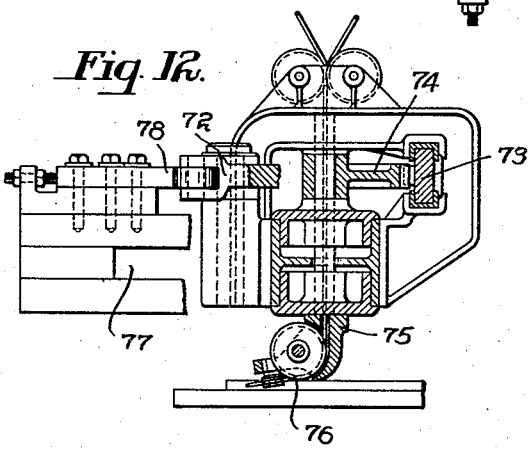
Fig. 12.
Fig. 14.
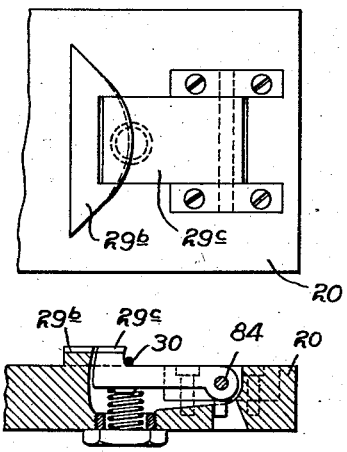
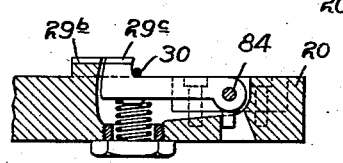
Fig. 15.
INVENTOR
William Edgar Reed,
By Archworth Martin,
Attorney.

May 7, 1935. W. E. REED 2,000,788
METHOD OF MAKING WIRE FABRIC
Filed April 12, 1933 9 Sheets-Sheet 6
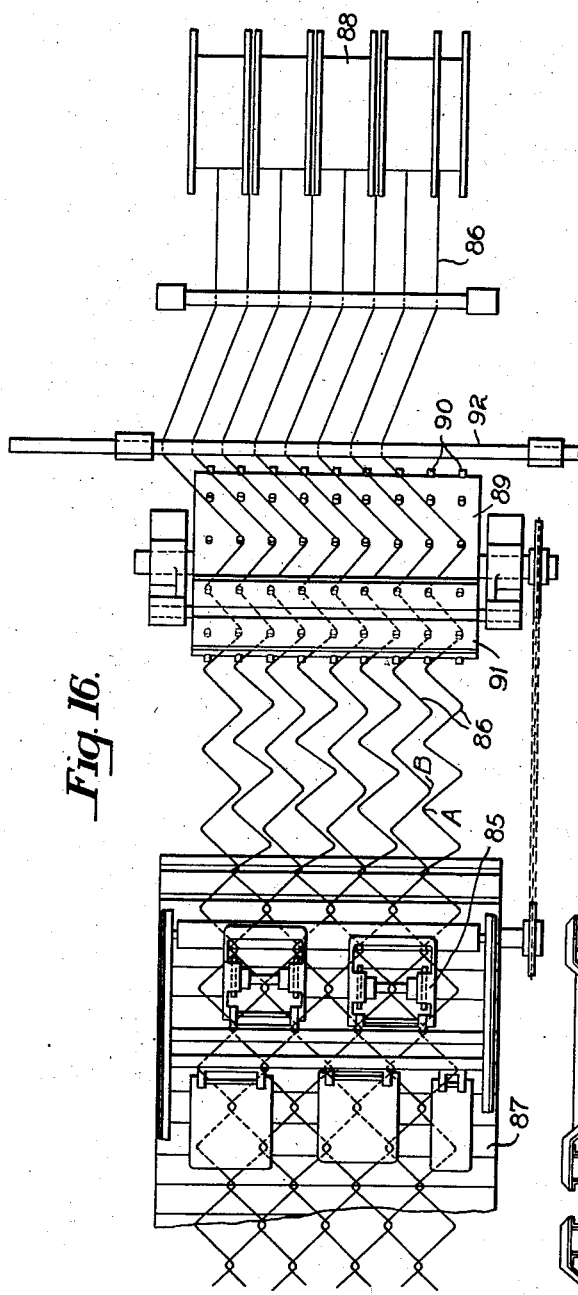
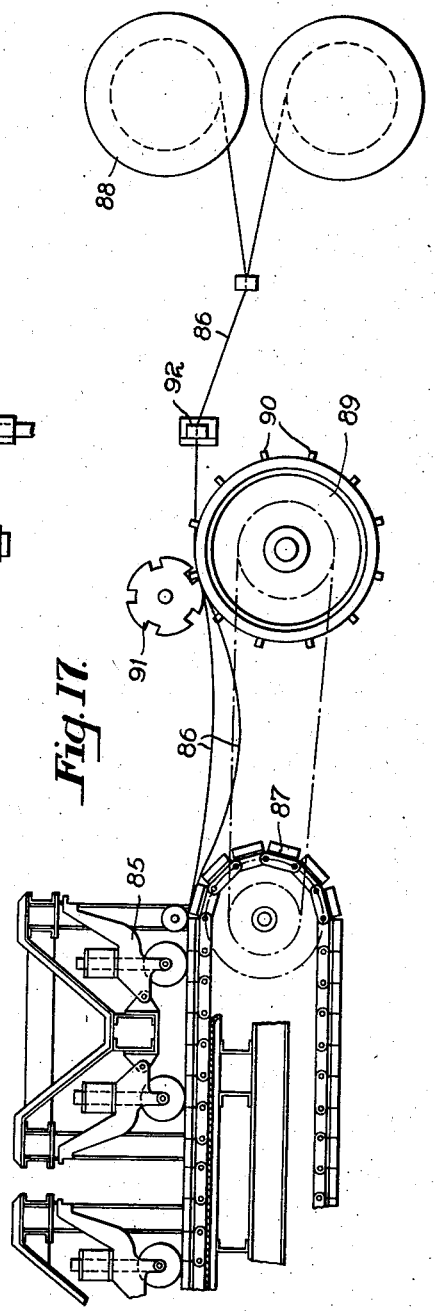
INVENTOR
William Edgar Reed,
By Archworth Martin,
Attorney.

May 7, 1935. W. E. REED 2,000,788
METHOD OF MAKING WIRE FABRIC
Filed April 12, 1933 9 Sheets-Sheet 8

INVENTOR
William Edgar Reed,
By Archworth Martin,
Attorney.

May 7, 1935. W. E. REED 2,000,788
METHOD OF MAKING WIRE FABRIC
Filed April 12, 1933 9 Sheets-Sheet 9
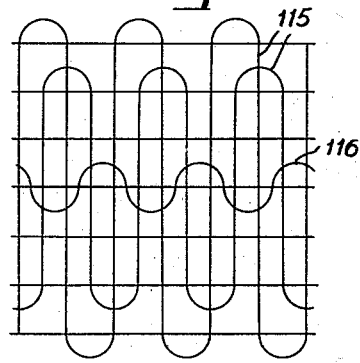
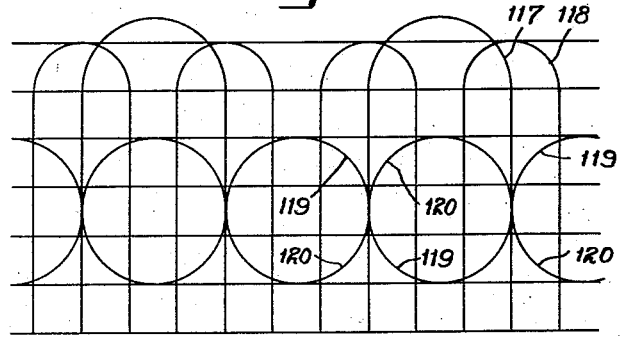
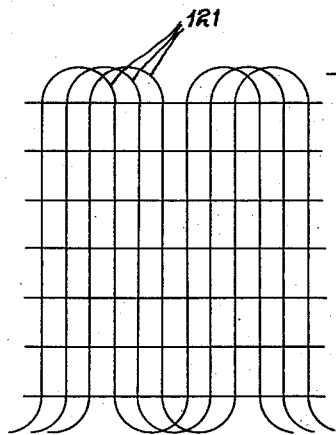
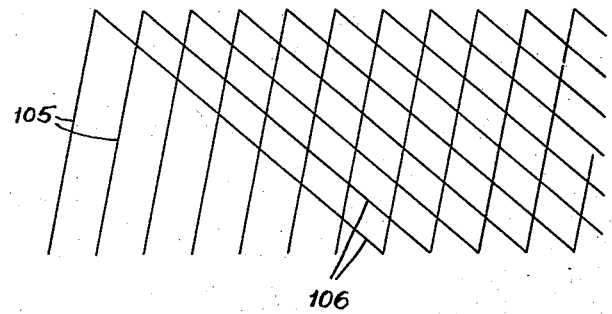
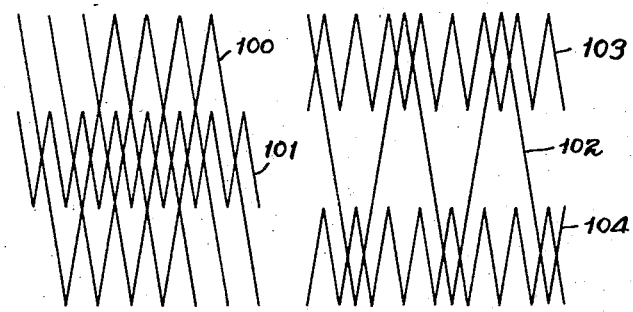
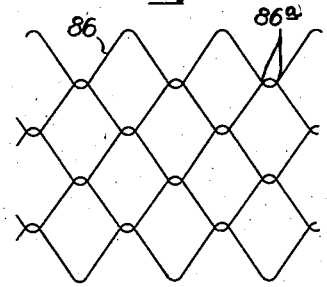
INVENTOR
William Edgar Reed,
By Archworth Martin,
Attorney.

Patented May 7, 1935

2,000,788

UNITED STATES PATENT OFFICE 2,000,788

METHOD OF MAKING WIRE FABRIC

William Edgar Reed, Pittsburgh, Pa.

Application April 12, 1933, Serial No. 665,710

25 Claims. (Cl. 140—112)

My invention relates to improvements in wire fabrics such as are employed for fencing, concrete reinforcement, screens and other mesh-like structures, and to a method of making the same. The present application constitutes in part a continuation of my copending application, Serial No. 393,692, filed September 19, 1929 (now Patent No. 1,908,050).

One object of my invention is to provide a method whereby a mesh may be formed of continuously extending sets of wires, with the wires of one set positioned in such relation to the wires of the other set that the fabric thus produced will have desired differences in mesh spacing and rigidity as between various portions thereof.

A further object of my invention is to provide a method whereby welded wire fabric may be formed from continuous strands, without the necessity of cutting, fitting and welding separate short lengths of material.

Another object of my invention is to provide a method of making welded fabric which involves depositing and bending continuous wires in overlapping relation, and welding the same at their points of contact with one another.

Figure 1:
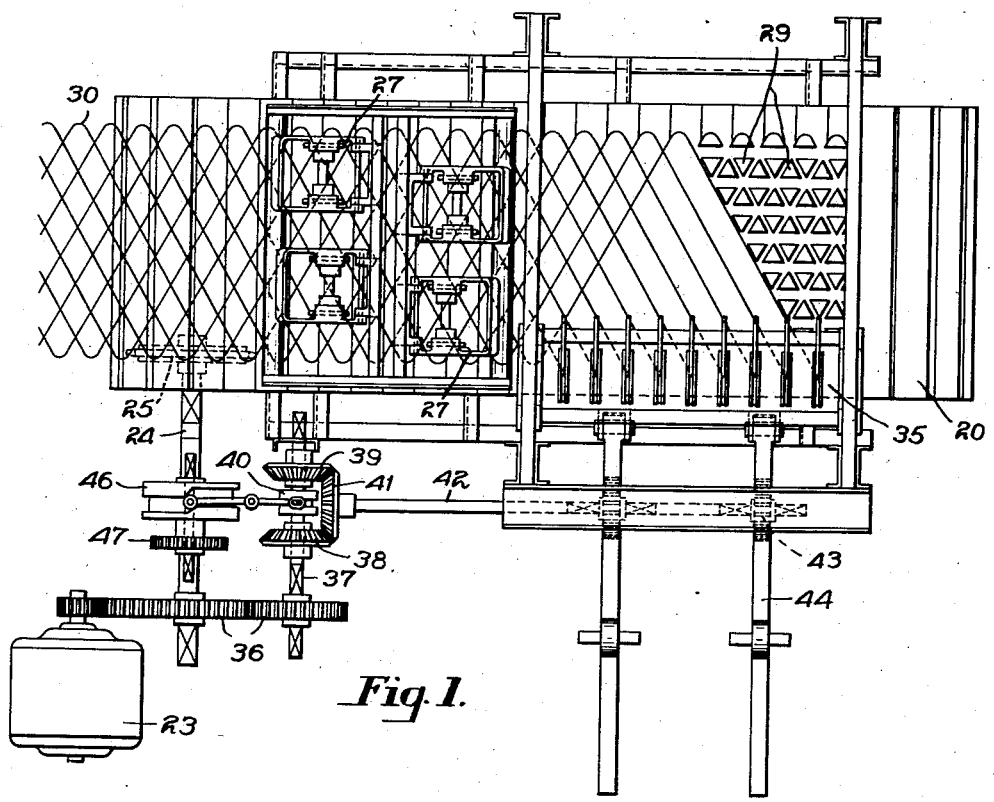
Figure 2:
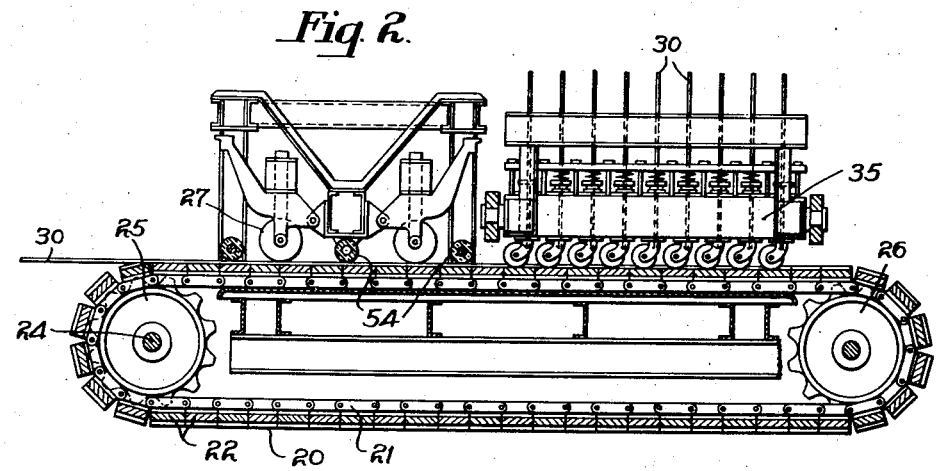
Figure 4:
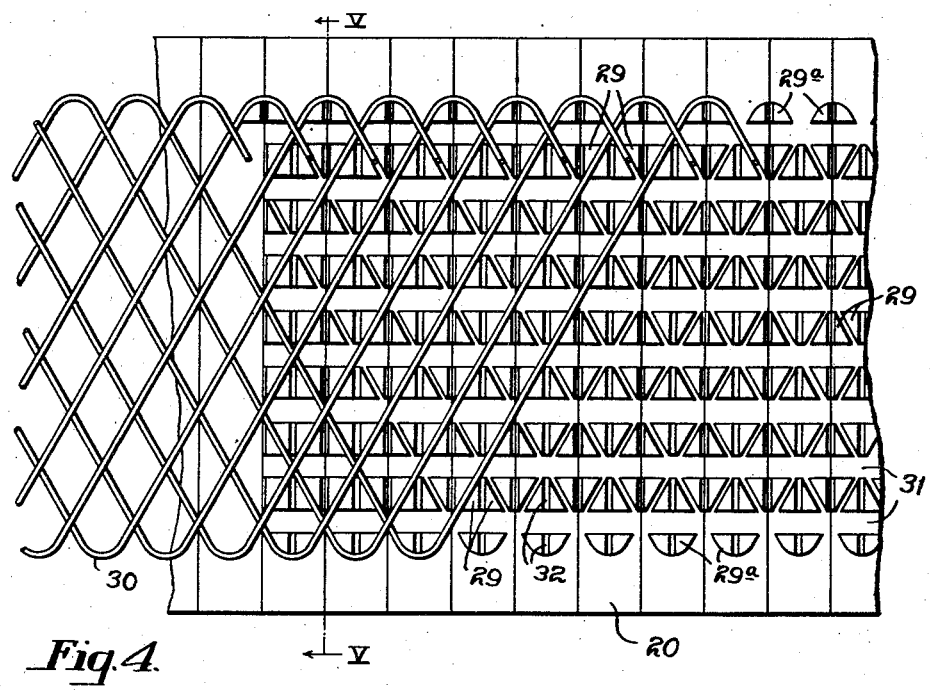
Figure 5:
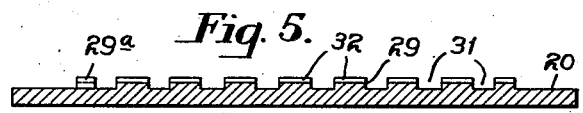
Figure 6:
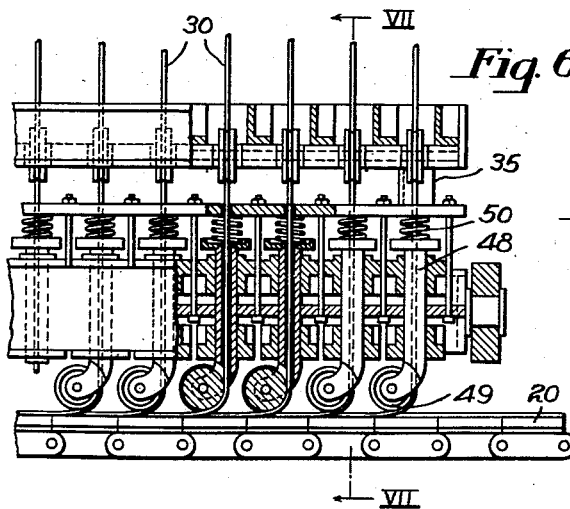
Figure 7:
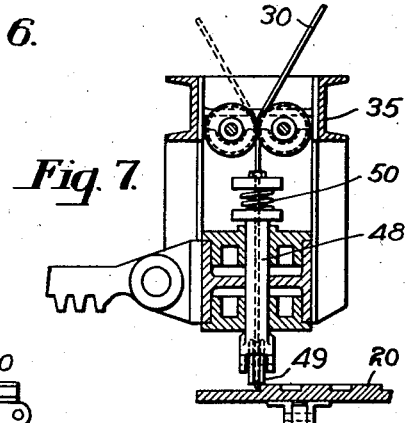
Figure 17A:
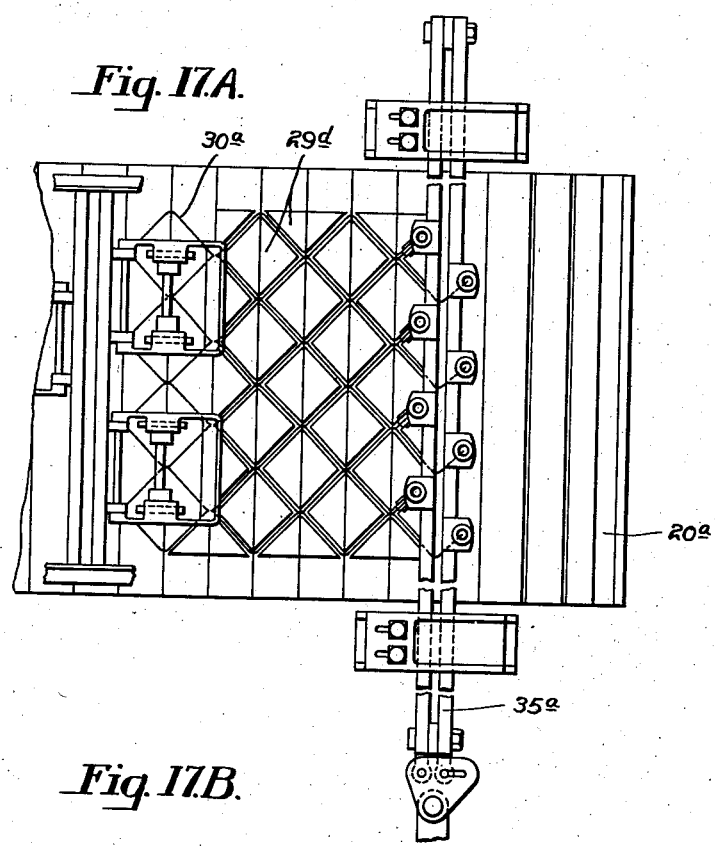
Figure 17B:
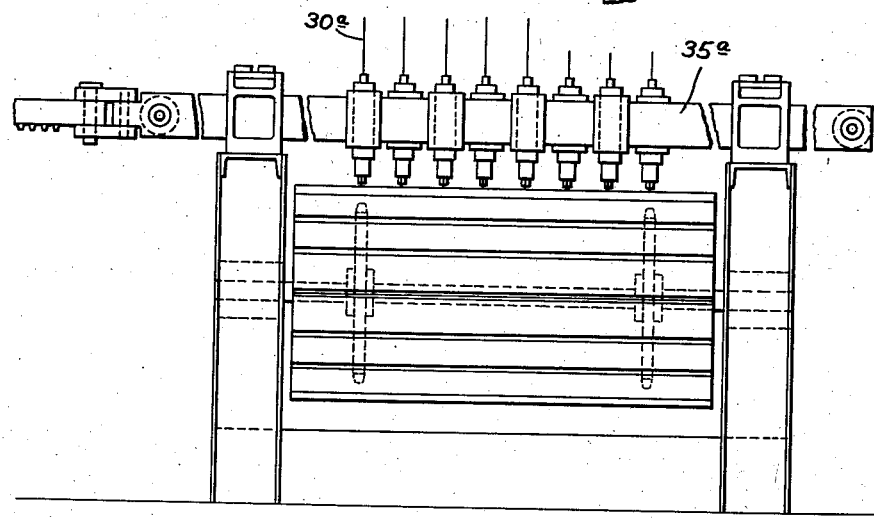
Figure 18:
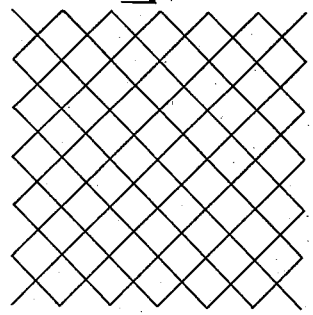

Some of the forms of fabric which may be manufactured in accordance with my invention are shown in the accompanying drawings wherein Figure 1 is a plan view of a machine for making fabric of continuous strands of wire; Fig. 2 is an elevational sectional view of the apparatus of Fig. 1; Fig. 3 is an end view of the structure of Figs. 1 and 2; Fig. 4 is a plan view, on an enlarged scale, of a portion of the apparatus of Fig. 1; Fig. 5 is a view taken on the line V—V of Fig. 4; Fig. 6 is a view, on an enlarged scale, of a portion of the apparatus of Fig. 1; Fig. 7 is a view taken on the line VII—VII of Fig. 6; Fig. 8 shows a modification of the structure of Figs. 1 to 7; Fig. 9 is a plan view showing still another modification thereof; Fig. 10 is an elevational sectional view of the structure of Fig. 9; Fig. 11 is a fragmentary plan view, on an enlarged scale, of a portion of the structure of Fig. 9; Fig. 12 is a sectional elevational view of the structure of Fig. 11; Fig. 13 is a view showing means for holding the wires in place at the edges of the conveyers of Figs. 1 to 10; Fig. 14 is a plan view showing a modification thereof; Fig. 15 is a sectional view of the structure of Fig. 14; Fig. 16 shows in plan view still another form of machine for making welded fabric of continuous strands; Fig. 17 is a side elevational view of the structure of Fig. 16; Figs. 17a and 17b are plan and cross sectional views, respectively, showing a modification of the apparatus of Figs. 1, 16 and 17, for forming the smaller bends in the strands, and Figs. 18 to 35 show various forms of fabric which may be formed upon the machines of Figs. 1 to 17.

Referring to Figs. 1 to 7, I show a machine for making diagonal mesh wire of continuous strands of the form shown more clearly in Figs. 1 and 4. The apparatus comprises a carrier or conveyer 20 that is composed of a pair of chains 21 which carry anvil bars 22 which may serve as electrode bars or be provided with electrode bars in a manner similar to the conveyer of my Patent No. 1,581,868, issued April 20, 1926. The conveyer is driven from an electric motor 23 that has driving connection with a shaft 24, which carries a pair of sprockets 25, the conveyer at its other end passing around idler sprockets 26.

Disposed above the carrier are a series of pairs of roller electrodes 27 beneath which the wires are carried and which make contact with the wires at their points of intersection, the electric circuit being completed at the instant that the wires are passing beneath the roller electrodes so that such wires will be welded at their points of contact with one another.

This portion of my structure need not be described in detail, since various forms of electrodes and current control devices therefor may be provided as shown for example in my patent above-referred to and in my Patent No. 1,694,081, of December 4, 1928, or welding electrodes similar to those of my Patent No. 1,554,030 of September 15, 1925, may be employed.

The anvil bars 20 differ from the anvil bars of my patents above-referred to in that I make provision thereon for holding transversely or diagonally placed fabric wires in proper position for welding, and so that their points of intersection will pass beneath the roller electrodes 27. The bars 20 are provided with bosses or upwardly-extending projections 29 which serve to define diagonally-extending groove-like spaces for the reception of wires 30, so that such wires will be supported in proper position upon the table. The projections also define groove-like spaces 31 which extend longitudinally of the table. These grooves or positioning bosses may, of course, be arranged transversely of the table, for the forming of certain shapes of mesh, particularly if the table or carrier is to be moved intermittently instead of continuously. As shown more clearly in Fig. 4, the wires 30 intersect at points within the spaces 31 so that they will be in proper position to be welded when such intersections pass beneath the roller electrodes 27.

The triangular projections 29 are grooved transversely of the conveyer as indicated at 32 to form seats for stay wires in case such wires are to be welded to the diagonally-extending wires as hereinafter explained.

The apparatus for feeding and placing the wire strands 30 upon the table consists of a carriage 35 that is reciprocable transversely of the carrier or table through driving connection with the motor 23. The motor 23 through its pinion and gears 36 drives a shaft 37 that carries differential units 38—39 that are normally idle upon the shaft 37, but which may selectively be brought into driving engagement therewith by means of a sliding clutch 40. The gear wheels 38—39 have driving connection with a gear wheel 41 which is secured to a shaft 42 that carries both pinions 43 that mesh with rack bars 44 which are connected to the feeder carriage 35.

The clutch 40 is operated by means of a cam 46 which is driven from the shaft 24 through gear connections 47. It will be seen that upon each revolution of the cam 46, the clutch 40 will be shifted to make and break driving connection between the gear wheels 38 and 39 successively, thus driving the shaft 42 alternately in opposite directions to effect reciprocation of the rack bars 44 and hence of the carriage 35 back and forth across the carrier.

The feeding carriage 35 is composed of a framework wherein a series of hollow vertical shafts 48 (Figs. 6 and 7) are journaled. The lower ends of these shafts carry guide rollers 49 and are yieldably held in contact with the conveyer by means of compression springs 50.

The strand wires 30 are drawn from reels 51 (Fig. 3) and pass through the shafts 48 and extend beneath the rollers 49. The shafts 48 are swivelled in the carriage 35 and since the rollers 49 are offset from the axis of these shafts after the manner of casters, such rollers will follow the direction of movement of the carriage 35.

It will be seen that with wires threaded through all of the shafts 48 and extending beneath the rollers 49, movement of the carriage transversely of the table, with the table or carrier 20 advancing, the angle of movement as between the carriage and the traveling table will be on diagonal lines and the relative rates of movement of the table and the carriage are such that the wires will be deposited between the bosses 29 on diagonal lines. The wire will be automatically drawn from the reels through the shafts 48 by reason of the movements of the carrier and the carriage.

When the carriage 35 has reached its limit of movement at one edge of the table, the clutch 40 will be automatically shifted to move the carriage in a reverse direction. At the reversal of movement, the strands 30 will be drawn around the bosses 29a near the edges of the tables, thus forming bends in the wires. It will be seen that on the return movement of the carriage 35, those portions of the strands 30 which are placed upon the table during such return movement will be deposited in overlapping relation to the wires which were deposited on the table during the previous movement of the carriage. The wires thus deposited on the table are held in place by means of rollers 54 (Fig. 2), so that they will not become displaced previous to engagement thereof with the roller electrodes, or they may be held in place by magnetic forces in the manner shown in my Patent No. 1,694,081 of December 4, 1928.

The mechanism just described produces a diamond or diagonal mesh wire as shown in Fig. 4, having flexibility to permit convenient stretching and installation thereof, since it will yield in longitudinal and transverse directions, as distinguished from those wire structures wherein strand and stay members extend in directions parallel to and transversely of the fabric structure.

In Fig. 8, I show a machine for incorporating straight strand wires 55 and stay wires 56 in the diagonally-shaped mesh structure of Fig. 4. In this structure, the carriage for feeding the diagonal wires and the electrodes for welding the same may be of the form shown in Figs. 1 and 2.

However, I interpose strand wire and stay wire feeding mechanisms between the carriage 35 and the electrodes, but these may be placed in advance of the carriage, if desired. These mechanisms may be of various known forms such as those shown in my two patents above-referred to. The stay wires 56 are deposited in the grooves 32 (Figs. 4 and 5) and the strand wires 55 are deposited in the grooves 31, so that they will intersect with each other and with the strand wires 30 at those points where the wires 30 overlap as above-explained. The stay wires 56 and the strand wires 55 can, of course, be welded to the strand wires 30 at points other than where said strand wires 30 intersect with one another. Therefore, the wires 30, 55 and 56 will be all welded together at definite points and form a mesh similar to that of Fig. 20. It will be understood that if it is desired to have the completed mesh readily yieldable longitudinally but stiffened and strengthened vertically, the strand wires 55 will be omitted, while if vertical elasticity and longitudinal rigidity are desired in the completed fabric, the stay wires 56 will be omitted.

In Figs. 9 and 10, I show a structure wherein a diagonal mesh fabric may be formed with much smaller mesh than is possible with the structure of Figs. 1 and 2, since the clearance possible in structures of this kind impose limitations in the way of size of mesh or spacing between the wires. Furthermore, this structure may be employed in making two sheets of mesh fabric on a single machine, each sheet having a mesh corresponding in size to that of Fig. 1.

The carrier and the electrodes of this form of apparatus may be similar to the corresponding parts of Figs. 1 and 2, except that two reciprocating carriages 60 and 61 are provided for placing the wires upon the carrier. Each of these carriages may be of the same form as the carriage 35 and reciprocated in a similar manner, by means of motors 62 and 63, respectively, which operate through suitable gearing and driving connections to reciprocate the carriages transversely of the table in the manner more fully explained above. These carriages may be reciprocated either synchronously or asynchronously.

Figure 19:
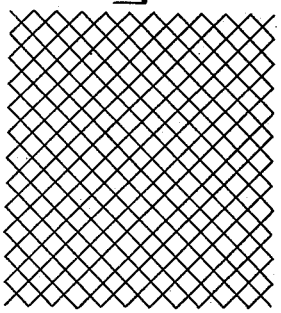
Figure 20:
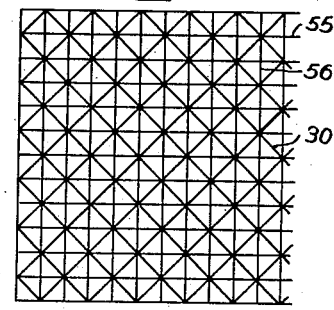

The carrier of Figs. 9 and 10 is continuously driven and may be of substantially the structure shown in Fig. 1, except that the bars 64 thereof which correspond to the bars 20 will have a greater number of grooves or bosses thereon for supporting the wire. As above-explained, each of the carriages 60 and 61 will deposit upon the carrier a mesh similar to the mesh of Fig. 1. The mesh 65 which is deposited by the carriage 61 will be overlapped by the mesh 66 which is deposited by the carriage 60, the points of intersection of the mesh 66 as indicated at 67 will be offset longitudinally and transversely of the carrier with respect to the points 68 wherein wires of the mesh 65 intersect with one another, while the mesh 66 and the mesh 65 will have contact with one another as at points 69. If the welds are made only at points 67 and 68, two separate meshes will be formed, each having substantially the appearance of Fig. 18, while if welds are made at the points 69, both the layers of fabric will be formed into a composite structure producing a mesh such as shown in Fig. 19.

Figure 26:
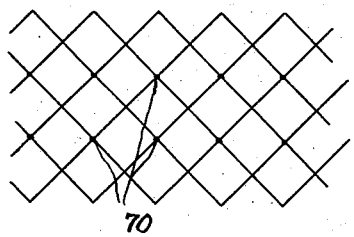
Figure 27:
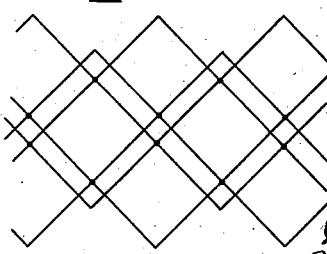

In the welding a fabric by the machines of either Figs. 1 to 9, certain intersections only need be welded as indicated at points 70 in Fig. 26. Fabric as in Figs. 9 and 26, welded only at points of intersection along alternate longitudinal lines, may be stretched as shown in Fig. 27 to give it the appearance of double strand mesh. For instance, if the fabric of Fig. 26 were one inch mesh it would be stretched to substantially two inch mesh with a double strand effect.

While the carriages of Figs. 9 and 10 may be of the same structure as the carriage of Fig. 1, if heavy wire is to be used in forming the fabric, I may modify such carriages to include means for positively bending the wires in making the bends at the edges of the carrier, such means being shown more clearly in Figs. 11 and 12. As shown in Figs. 9, 11 and 12, each carriage contains a bell crank 72 that is pivotally mounted thereon and which has connection with a rack bar 73 that cooperates with toothed segments 74 to oscillate the shafts 75 through which the wires are fed.

The shafts 75 each carry a roller 76 at its lower end which lower rollers correspond to the rollers 49 of Fig. 6. The carriages 61 are each slidably supported at both ends by guide bars 77 and the outer extremities of the bell crank levers 72 engage stops 78 near each end of the guide bars 77 so that when the carriage approaches an extremity of its path of movement, the bell cranks 72 will be rocked about their pivots to turn the shafts 75 about their axes, so that the wires will be more securely guided and drawn through their grooved paths at the edges of the carriage. In Fig. 13, I show a means for more effectively holding the bent portions of the wire at the edges of the fabric in position upon the carrier.

A portion of the framework 35a of the carriage 35 serves, at the end of transverse movement of the carriage, to rock a spring-pressed arm 80 about its pivot 81 and against the compression of a spring 82 to move a roller 83 which is carried by the arm 80 away from the edge of the guide block 29a to permit the wire to be bent around such block or boss. At the beginning of the return movement of the carriage, the arm 80 will be released by the frame member 35a, permitting the spring to force the roller 83 into contact with the wire and the wire bend thereby held in snug engagement with the boss 29a.

In Figs. 14 and 15, I show a modification of the holding device of Fig. 13. In this arrangement, each holding boss is shown as made in two pieces 29b and 29c, the portion 29c being undercut slightly as shown in Fig. 15, for the reception of the edge bend of a wire 30 and being pivoted at 84 to the carrier bar 20. The wire 30 is bent around the portion 29c in a manner similar to that shown at 29a in Fig. 4 and being under some tension is held in said undercut recess against accidental displacement.

Either or both of the carriages 60 and 61 may be reciprocated along lines extending only partially the full width of the fabric being produced. For instance, the carriage 60 may be reciprocated entirely across the table and the carriage 61 only partially across the same, so that a fabric can be produced which in one portion will have the comparatively wide mesh of Figs. 1 and 18, and in another longitudinal portion thereof will be of closer mesh as in Fig. 33, indicated somewhat diagrammatically by the strands 100 and 101 which are welded together. Again, each carriage may be moved only to the longitudinal center line of the carrier to lay two mats of wire which may be each welded as above set forth and which may be welded together at their inner edges.

If three depositing carriages are employed, one of them may be reciprocated entirely across the carrier to lay the strands 102 of Fig. 34, while two may be reciprocated in zones adjacent to the edges of the table to lay strands 103 and 104 which are welded to the strand 102, at points where they cross the strand 102.

The fabrics of Figs. 33 and 34 not only differ in their ornamental appearance, but possess different physical properties. Thus if a fabric is formed wherein the closer mesh is required near the longitudinal middle line, the additional strands 101 can be embodied therein, while if a fabric is desired that has greater strength and closer mesh at its edges, the strands 103 and 104 will be applied to the strand 102.

The mesh of Fig. 32 may be produced by laying the portions 105 of the strands more rapidly relative to the movement of the table than the portion 106 of the strands are laid, the strands where they cross being, of course, welded together. This procedure produces a fabric which offers greater resistance to stretching or has less elasticity through stresses imparted thereto in certain directions than in other directions.

Figure 24:
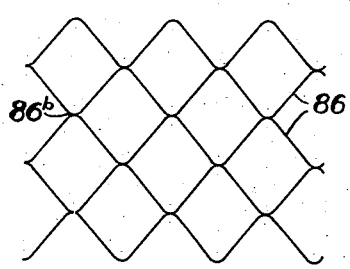
Figure 25:
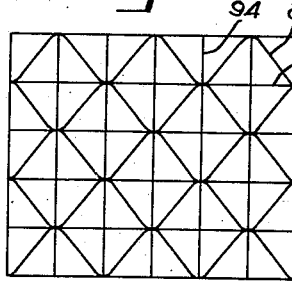

Referring now to Figs. 16 and 17, I show a structure for making a fabric of the types shown in Figs. 24 and 35. In this form of device, I show a welding apparatus 85 which may be of a form shown in my patents above-referred to. In this form, I bend the strands 86 previous to their entry upon the conveyer 87. The bars of the conveyer 87 may have diagonally-arranged slots or bosses of substantially the form shown in Figs. 1 to 4, to maintain the bent strands in proper welding position upon the carrier. In this form of apparatus, the wire is fed from a reel or reels 50 88 and passes over a toothed roller or drum 89 which is driven in any suitable manner. The drum 89 contains rows of teeth 90 that are arranged in rows longitudinally of the roller, and the wires are fed between the roller 89 and a pressure roller 91.

A reciprocating bar 92 which is reciprocated longitudinally of the roller 89 and which has openings through which the wires 86 are threaded, is operated by suitable mechanism in timed relation to the rotative movement of the roller 89, so that as each row of pins comes into position opposite to the wires, the bars 92 will be shifted longitudinally of the roller to effect bending of the wires about the pins of that particular row. As the rotation of the roller 89 continues, another row of pins will be brought into operative position with respect to the wire and movement thereupon imparted to the bar 92 in the opposite direction to bend the wires about the succeeding rows of pins.

The wires as they pass from between the rollers 89 and 91 will have bends formed thereon and will enter the angular slots on the carrier, to be thereby carried beneath the roller electrodes. In order that the angles A and B of adjacent strands may be brought into welding position with respect to one another, alternate strands will be given more slack between the rollers and the carriage as shown more clearly in Fig. 17, so that alternate strands will sag below the adjacent strands and the angle portions A and B of the strands will therefore enter upon the conveyer in superposed or overlapping relation to pass beneath the roller electrodes in such position so that they will be welded together and thus form a fabric structure as shown in Fig. 35.

Fig. 35 differs from Fig. 24, in that it has the bends of the various wires in overlapping relation and welding may be effected at two points 86a wherever the bends of the various strands come into overlying relation. In the structure of Fig. 24, the bends are brought into merely abutting relation as indicated at 86b, instead of into overlapping relation as in 35. The mesh of Fig. 24 will, of course, be flatter than that of Fig. 35, since all parts of the various strands lie in a common plane.

If it is desired to incorporate stiffening strands and stay wires in the fabrics of Figs. 24 and 35, such strand and stay wires may be fed to the machine of Fig. 16 in a manner similar to that whereby the additional strand and stay wires are fed as in Fig. 8. In that case, the diagonal strands 86 of Fig. 25 will be supplemented by stay wires 94 and straight strand wires 95.

Figs. 17a and 17b show a modification of the structures of Figs. 1, 2, 4, 8, 9, 10, 16 and 17, in that they disclose a transverse carriage reciprocating transversely of the carrier. In this device a carriage 35a may be reciprocated transversely of the carrier 20a in a manner similar to the reciprocation of the carriage 35 of Fig. 1. One or more carriages 35a may be used for making different fabrics.

The travel of this reciprocation may be the full width of the carrier or a fraction thereof. When the travel of carriage 35a is a fraction of the width of the carrier fabrics similar to those of Figs. 24, 25 and 28 may be produced—and where the travel is the full width fabrics similar to those of Figs. 18, 19, 20, 21, 22 and 23 are produced.

One example of fabric made by short travel is shown in Fig. 17a in which each strand 30a is bent back and forth about the lugs 29d, in overlapping or abutting relation so that they may be welded together at points of contact as in Figs. 24 and 35.

Figure 21:
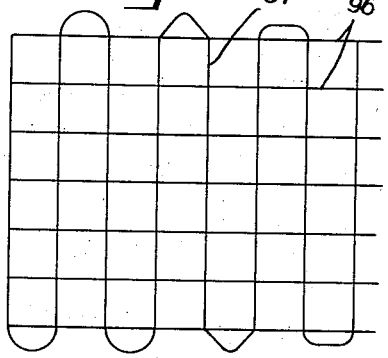

In Fig. 21, I show a form of fabric which may be formed on the machine of Figs. 8 or 17a, if certain of the feed devices of Fig. 8 be omitted. In this form of device, strand wires 96 may be fed to the machine as are the strand wires 55 of Fig. 8, the stay wires 56 being omitted. Certain of the feeding members may be omitted from the carriage 35 and the wires 97 fed through only one of the guide devices of the carriage.

In order that the wire 97 will be disposed mainly at right angles to the wires 96, the depositing carriage 35 can be shifted longitudinally of the moving table simultaneously with its movement across the table, the conveyer 20 may be given only an intermittent movement, it being held stationary during transverse travel of the carriage 35 and permitted to move only at the end of each transverse movement of such carrier. The rate and amplitude of movement of the carrier at each step will determine the spacing between the transversely-extending portions of the wires 97 and the bends at the edges of the fabric may be given various forms through the employment of guide blocks or bosses of various shapes, such bosses corresponding to the bosses 29a of Fig. 4.

Not only will the relative rates of movement as between the carrier and the carriages for depositing the wires determine the spacing in the mesh, but the variations in such relative rates of movement will also result in variations in fabric patterns, particularly if either the carrier or the carriage or both are given variable rates of movement during each cycle of movement of the carriage or during certain cycles of movement thereof.

Figure 22:
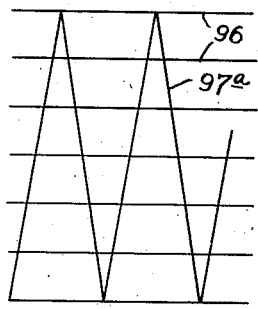

In Fig. 22, I show a fabric which may be made substantially in the manner described in connection with the fabric of Fig. 21, in that a single strand of wire 97a is fed transversely of the strand wires 96, but with the conveyer continuously moving.

Figure 23:
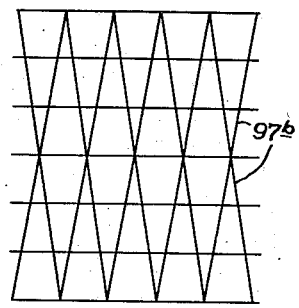

In Fig. 23, the mesh is formed as at Fig. 22, but with two transverse strands 97b supplied to the machine.

Figure 28:
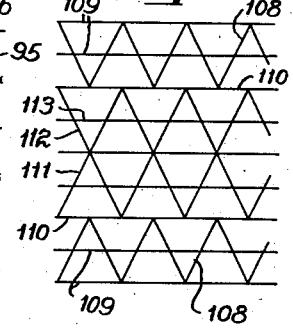

In Fig. 28, I show a structure constituting a modification of that shown in Fig. 23. In this structure there is a bent strand 108 at each edge of the fabric, welded to longitudinal strands 109 and 110. Intermediate bent strands 111 and 112 are also welded at their bends to the strands 110 and to intermediate strands 113.

Figs. 29, 30 and 31 show structures wherein certain of the strands are bent and laid with intermittent movement of the carrier, as described in connection with the discussion of Fig. 21. In this case, a pair of depositors will place the bent strands 115 and a third depositor will place the intermediate bent strands 116, these strands being all welded together or to the straight strands, as may be desired.

In Fig. 30, strands 117 and 118 are bent and laid in a manner similar to the laying of the strands 97 of Fig. 21, and the lower ends of these bent strands can be sheared off after completion of the fabric to leave a smooth bottom edge instead of the scroll bottom edge of Fig. 29. In this form of mesh, there are two central strands 119 and 120, each bent through 180° alternately in opposite directions, and welded to certain of the other wires.

In Fig. 31, there are three strands 121 bent and laid instead of the single strand 97 of Fig. 21.

I claim as my invention:

1. The method which comprises laying wires by a reciprocatory movement in a given plane, bending said wires around supports at the ends of the paths of travel in directions parallel to said plane, and uniting the wires thus laid to form a fabric.

2. The method which comprises laying wires by a reciprocatory movement in a given plane, bending said wires around supports at the ends of the paths of travel in directions parallel to said plane, while imparting relative traveling movement to said supports and the wires in a direction generally transverse to the paths of reciprocatory movement, and uniting the wires thus laid, to form a fabric.

3. The method which comprises depositing wire strands on a supporting surface, laying continuous wires thereon in directions generally transverse to said strands, the continuous wires being bent in directions parallel to the plane of said surface, and securing the first-named strands to said continuous strands.

4. The method of forming wire fabric which comprises depositing strands of wire upon a supporting surface by reciprocatory movement in a single plane, transversely of the said surface, simultaneously causing relative traveling movement of the deposited portions of the strands and those portions thereof which are being deposited, and uniting the strands to form a unitary structure.

5. The method of forming wire fabric which comprises depositing strands of wire upon a supporting surface by reciprocatory movement in a single plane, transversely of the said surface, simultaneously causing relative traveling movement of the deposited portions of the strands and those portions thereof which are being deposited, the relative rates of reciprocatory and traveling movements being varied in accordance with the pattern desired, and uniting the strands to form a unitary structure.

6. The method of forming wire fabric which comprises depositing strands of wire upon a supporting surface by reciprocatory movement in a single plane, transversely of said surface, simultaneously causing relative traveling movement of the deposited portions of the strands and those portions thereof which are being deposited, the said traveling movement being at such rate that those portions of the wires deposited in one direction of reciprocatory movement will be at least partially overlapped by those portions of the wires deposited in the other direction of reciprocatory movement, and uniting the strands to form a unitary structure.

7. The method which comprises depositing, simultaneously, one layer of continuous strands of wire in one direction, and then changing the direction of laying to deposit a second layer of the same wires upon the first layer across the width of the fabric, and uniting their points of contact.

8. The method of forming sheets of wire fabric which comprises advancing wire strands by traveling movement, simultaneously bending at least some of the strands transversely of the path of travel, in a given plane and through a distance substantially equal to the width of the fabric, and securing the strands together.

9. The method of forming sheets of wire fabric which comprises advancing wire strands by traveling movement, simultaneously bending some of the wires transversely of the path of travel, over a portion of the width of the completed fabric, bending other strands transversely of the path of travel over only another portion of the width of the fabric, and securing the two groups of strands together.

10. The method of forming wire fabric, consisting of continuously placing one layer of wires and then another layer thereof, at a different angle and crossing the first layer, welding the layers together at their points of crossing, then placing a successive layer of wire thereon and welding the successive layer to the existing welded layers.

11. The method of forming wire fabric consisting of laying one series of wires continuously upon a moving table back and forth from one edge of the fabric to the other, in a given plane, the elapsed time of laying movements being such that the spacing will be equal for all wires in the entire fabric that are laid in the same direction.

12. The method of forming wire fabrics consisting of laying two separate series of wires continuously upon a moving table from one side to the other and return, in a given plane in such elapsed time that both series fit into the fabric in such manner that all wires in the entire fabric that are laid in the same direction have the same spacing, and same angularity with respect to the longitudinal line of the fabric.

13. The method of making welded wire fabric which comprises passing a continuous strand back and forth in a given plane across longitudinal strands, imparting relative traveling movement to the longitudinal strands and the other strands at a rate dependent upon the desired pattern, and welding the longitudinal strands to the other strands.

14. The method of making welded wire fabric, which comprises advancing a series of wires along a supporting surface, simultaneously bending and positioning other wires in abutting engagement with the first-named wires, and welding the two series of wires together.

15. The method of forming wire fabric which comprises depositing strands of wire upon one side of a traveling supporting surface by reciprocatory movement transversely of the said surface, with certain deposited strands having contact with other strands, and uniting the strands at their points of contact, to form a unitary structure.

16. The method of forming wire fabric which comprises depositing strands of wire upon a traveling supporting surface by reciprocatory movement transversely of the said surface with certain deposited strands having contact with other strands, and uniting the strands at their points of contact to form a unitary structure, certain of the strands being laid across the fabric for a distance less than the full width of the fabric.

17. The method which comprises depositing a continuous wire strand on a table by movement thereof through a path that is perpendicular to the table and thence through paths disposed in parallelism with the table, and securing together those portions of the wire which are located in the last-named paths.

18. The method which comprises depositing a continuous wire strand on a table by movement thereof through a path that is perpendicular to the table and thence through paths disposed in parallelism with the table, and securing together those portions of the wire which are located in the last-named paths, the wire while passing through the said vertical path being shifted in to-and-fro directions parallel to the plane of the table.

19. The method which comprises laying wires by reciprocatory and progressive movements in a given plane, bending said wires in directions parallel to the said plane, around supports at the end of each path of travel, uniting the wires thus laid to form a fabric, and removing the wires from said supports.

20. The method which comprises laying continuous wires transversely of a table in both directions, bending said wires in directions parallel to the plane of the table, at points adjacent to the edges of the table, maintaining said bends in flatwise position, uniting the wires to form a unitary structure, and releasing said bends.

21. The method of forming fabric which comprises folding a set of laterally-spaced strands simultaneously back and forth along diagonal lines, to form layers of the strands, with each layer partially overlying another layer, and securing the layers together.

22. The method of forming fabric which comprises depositing one layer of continuous strands simultaneously, in one direction, continuing the depositing movement in another direction to form another layer partially overlying the first-named layer, and securing the strands together in unitary relation.

23. The method of forming fabric which comprises depositing one layer of continuous strands simultaneously, in one direction, continuing the depositing movement in another direction to form another layer partially overlying the first-named layer, and securing the strands together in unitary relation at points where they cross one another.

24. The method of forming fabric structures which comprises placing laterally-spaced wires upon a supporting surface by laying them in oppositely-extending diagonal lines and bending them in directions parallel to the plane of said surface, similarly bending and laying a second series of wires, certain of the wires extending only partially across the width of the fabric, and securing the various wires together in unitary relation.

25. The method of making wire fabric, which comprises placing one layer of continuous wires, bending the said wires to form a layer partially overlying the first layer, then placing on said layers a second series of wires bent to form similar layers, but with the wires of each series offset relative to the wires of the other series, in directions longitudinally of the fabric, and securing the various wires into unitary relation.

WILLIAM EDGAR REED.